United States Patent
McKenney et al.

(10) Patent No.: US 7,472,228 B2
(45) Date of Patent: Dec. 30, 2008

(54) READ-COPY UPDATE METHOD

(75) Inventors: Paul E. McKenney, Beaverton, OR (US); Orran Y. Krieger, Newton, MA (US); Jonathan Appavoo, White Plains, NY (US); Dipankar Sarma, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 10/974,515

(22) Filed: Oct. 27, 2004

(65) Prior Publication Data
US 2006/0100996 A1    May 11, 2006

(51) Int. Cl.
*G06F 12/00* (2006.01)
*G06F 12/12* (2006.01)

(52) U.S. Cl. .................. 711/141; 711/147; 711/154; 711/159

(58) Field of Classification Search ........... 711/141, 711/147, 159
See application file for complete search history.

(56) References Cited

U.S. PATENT DOCUMENTS

| | | | | |
|---|---|---|---|---|
| 5,442,758 | A * | 8/1995 | Slingwine et al. | 707/8 |
| 5,727,209 | A | 3/1998 | Slingwine et al. | 395/672 |
| 6,377,959 | B1 | 4/2002 | Carlson | 707/202 |
| 6,490,671 | B1 * | 12/2002 | Frank et al. | 711/207 |
| 6,578,114 | B2 | 6/2003 | Breuder et al. | 711/141 |
| 2001/0037445 | A1 | 11/2001 | Mukherjee | 712/216 |
| 2003/0041218 | A1 * | 2/2003 | Kataria | 711/156 |

OTHER PUBLICATIONS

McKenney, Paul, "Exploiting Deferred Destruction: An Analysis of Read-Copy-Update Techniques in Operating System Kernels", Jul. 2004, pp. xxi-xxii, 83-90, 108-132.*
McKenney et al., "Read Copy Update" Jul. 2002.*
Paul E. McKenney et al, "Scaling deache with RCU", Linux Journal (Jan. 1, 2004).
Landon P. Cox, "Samsara: Honor Among Thieves in Peer-to-Peer Storage". Department of Electrical Engineering and Computer Science, University of Michigan (Oct. 19, 2003).
Paul E. McKenney, "Using RCU in the Linux 2.5 Kernel". Linux Journal (Oct. 1, 2003).
Paul E. McKenney et al, "Read-Copy Update: Using Execution History To Solve Concurrency Problems", Parallel and Distributed Computing and Systems, pp. 509-518 (Oct. 1998).

(Continued)

*Primary Examiner*—Matt Kim
*Assistant Examiner*—Michael C Krofcheck
(74) *Attorney, Agent, or Firm*—Walter W. Duft; Abdy Raissinia

(57) ABSTRACT

A method for managing requests for deferred updates to shared data elements while minimizing grace period detection overhead associated with determining whether pre-existing references to the data elements have been removed. Plural update requests that are eligible for grace period detection are buffered without performing grace period detection processing. One or more conditions that could warrant commencement of grace period detection processing are monitored while the update requests are buffered. If warranted by such a condition, grace period detection is performed relative to the update requests so that they can be processed. In this way, grace period detection overhead can be amortized over plural update requests while being sensitive to conditions warranting prompt grace period detection.

11 Claims, 7 Drawing Sheets

OTHER PUBLICATIONS

Sup Park Chang et al., "A Replica Control Method For Improving Availability For Read-Only Transactions," Dept. of Comp. Sci, Korea Adv. Inst. Of Sci & Technol., 1997, Abstract Only, 1 page.

OT Satyanarayanan et al., "Efficient Execution of Read-Only Transactions in Replicated Multiversion Databases," IEEE Transactions on Knowledge and Data Engineering, vol. 5, No. 5, Oct. 1993, Abstract Only, 1 page.

Sooyeon Park et al., "Dynamic Copy Security in Real-Time Database Systems," Journal of KISS(B), vol. 26, No. 8, Aug. 1999, Abstract Only, 1 page.

* cited by examiner

READ-COPY UPDATE METHOD

BACKGROUND OF THE INVENTION

1. Field of the Invention

The present invention relates to computer systems and methods in which data resources are shared among concurrent data consumers while preserving data integrity and consistency relative to each consumer. More particularly, the invention concerns improvements to a mutual exclusion mechanism known as "read-copy update," in which lock-free data read operations run concurrently with data update operations.

2. Description of the Prior Art

By way of background, read-copy update is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of operations that may be currently referencing the data. The other view is the new (post-update) data state that is available for the benefit of operations that access the data following the update. In the second (deferred update) phase, the old data state is removed following a "grace period" that is long enough to ensure that all executing operations will no longer maintain references to the pre-update data.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring a spinlock, allocating new memory for B', copying the contents of B to B', modifying B' as needed, updating the pointer from A to B so that it points to B', and releasing the spinlock. All subsequent (post update) readers that traverse the linked list, such as the reader r2, will thus see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU (as can other operations that will not be listed here).

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred data update following a grace period, including but not limited to the use of callback processing as described in commonly assigned U.S. Pat. No. 5,727,209, entitled "Apparatus And Method For Achieving Reduced Overhead Mutual-Exclusion And Maintaining Coherency In A Multiprocessor System Utilizing Execution History And Thread Monitoring." The contents of U.S. Pat. No. 5,727,209 are hereby incorporated herein by this reference.

The callback processing technique contemplates that an updater of a shared data element will perform the initial (first phase) data update operation that creates the new view of the data being updated, and then specify a callback function for performing the deferred (second phase) data update operation that removes the old view of the data being updated. The updater will register the callback function (hereinafter referred to as a callback) with a read-copy update subsystem so that it can be executed at the end of the grace period. The read-copy update subsystem keeps track of pending callbacks for each processor and monitors per-processor quiescent state activity in order to detect when a current grace period has expired. When it does, all scheduled callbacks that are ripe for processing are executed.

Because grace period detection consumes processing cycles, it is undesirable to incur such overhead unless there are pending callbacks in the read-copy update subsystem. Moreover, the greater the number of pending callbacks that are processed per grace period, the more efficiently the overhead of grace period detection can be amortized. On the other hand, callback processing is sometimes urgent, such as during low-memory conditions wherein memory could be freed by removing the old data. In that case, the situation may justify prompt callback processing without regard to grace period detection overhead.

It is to solving the foregoing problems that the present invention is directed. In particular, what is needed is a new read-copy update technique that achieves the goal of amortizing grace period detection over plural callbacks while being sensitive to urgent callback conditions.

SUMMARY OF THE INVENTION

The foregoing problems are solved and an advance in the art is obtained by a method for managing requests for deferred updates to shared data elements (such as callbacks if the invention is implemented in a callback-based read-copy update system) while minimizing grace period detection overhead associated with determining whether pre-existing references to the data elements have been removed. According to exemplary embodiments of the invention, plural update requests that are eligible for grace period detection are buffered without performing grace period detection processing. One or more conditions that could warrant commencement of grace period detection processing are monitored while the update requests are buffered. If warranted by such a condition, grace period detection is performed relative to the update requests so that they can be processed. In this way, grace period detection overhead can be amortized over plural update requests while being sensitive to conditions warranting prompt grace period detection.

In further exemplary embodiments of the invention, the condition(s) being monitored can be one or more of (1) the buffered update requests reaching a threshold number, (2) the buffered update requests being buffered for a threshold time period, (3) the buffered update requests including an update request designated as urgent, (4) a low-memory event being encountered, and (5) a low-memory event being encountered on a memory type and the buffered update requests including an update request corresponding to the memory type.

The condition(s) can be identified in various ways, including as an explicit indicator associated with one of the update requests. The explicit indicator can be passed as parameter when a function associated with the update request is invoked. Alternatively, the indicator can be generated by the update request being invoked using a pre-designated update request function. As indicated above, the condition(s) can also be system-related, such as a low memory condition.

The update requests can be buffered on a queue that is separate from existing queues within a read-copy update subsystem, or it can be buffered on one of the existing queues. In the first implementation, the buffered update requests can be buffered on a staging queue and then moved to an existing queue in the read-copy update subsystem upon the occurrence of a condition warranting grace period detection processing. In the second implementation, the update requests can be buffered on one of the existing queues in the read-copy update subsystem, and held there until the occurrence of the condition warranting grace period detection processing. For example, the read-copy update subsystem could include a first queue of update requests awaiting expiration of a grace period and a second queue of update requests awaiting processing of the update requests in the first queue. The update requests could be buffered on the second queue and then moved to the first queue upon the occurrence of the condition warranting grace period detection processing.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 1A:
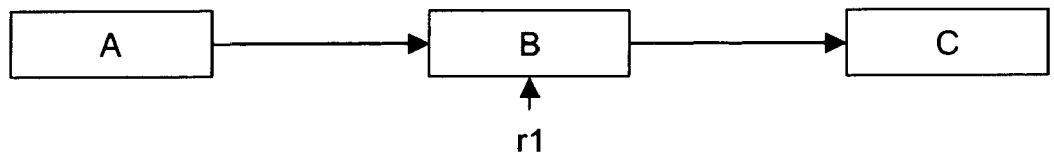
FIGS. 1A-1D are diagrammatic representations of a linked list of data elements undergoing a data element replacement according to a conventional read-copy update mechanism.
Figure 1B:
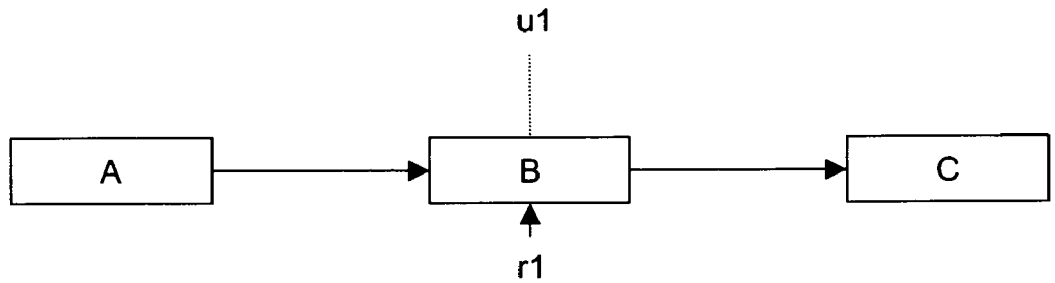
Figure 1C:
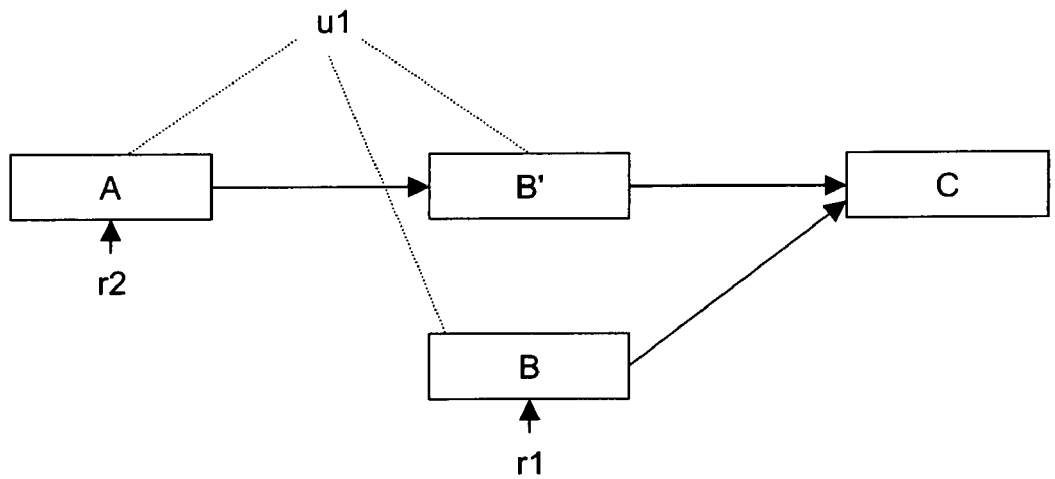
Figure 1D:
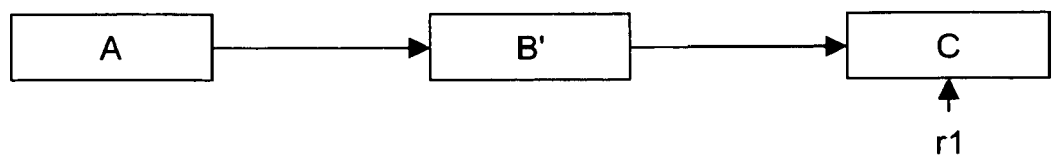
Figure 2A:
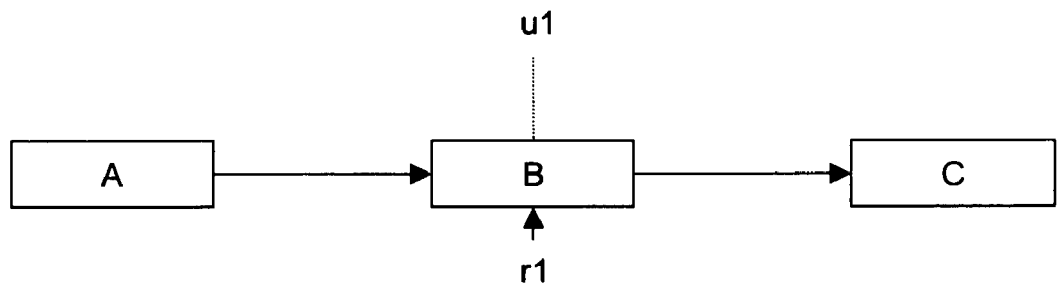
FIGS. 2A-2C are diagrammatic representations of a linked list of data elements undergoing a data element deletion according to a conventional read-copy update mechanism.
Figure 2B:
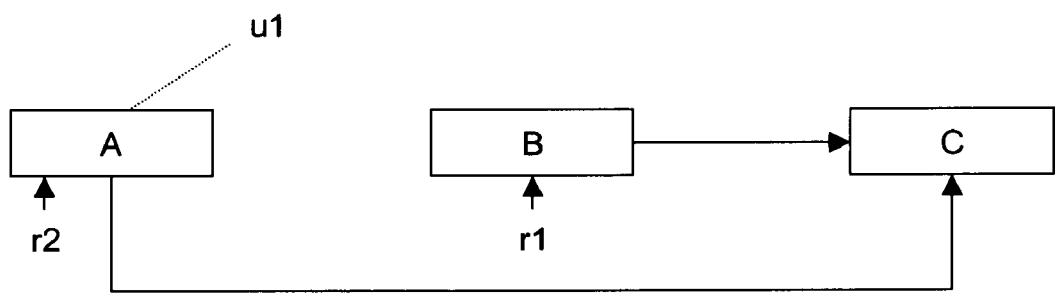
Figure 2C:
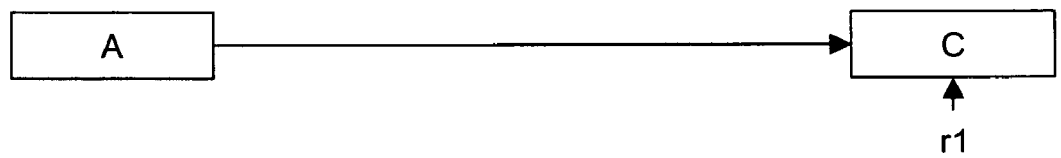
Figure 3:
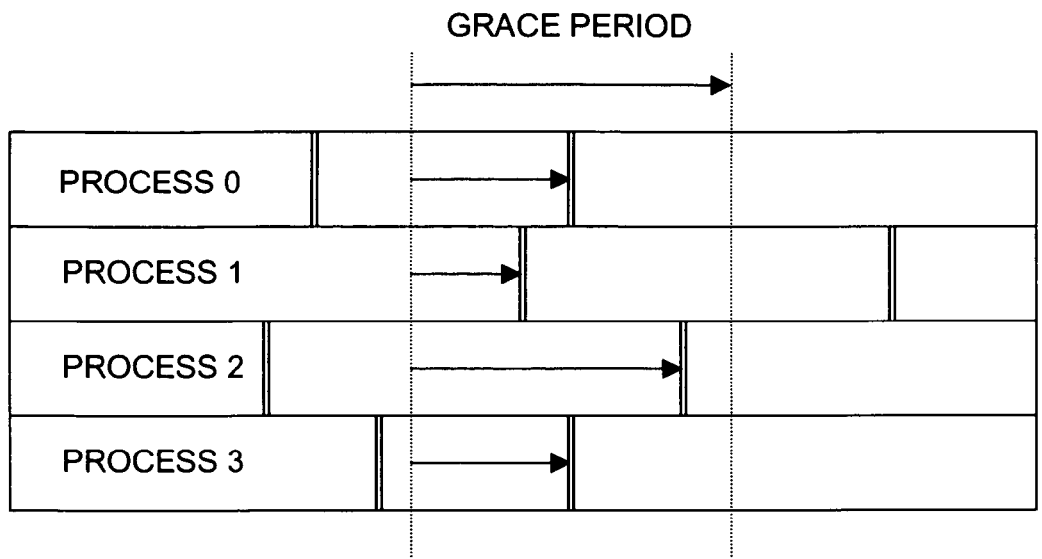
FIG. 3 is a flow diagram illustrating a grace period in which four processes pass through a quiescent state.
Figure 4:
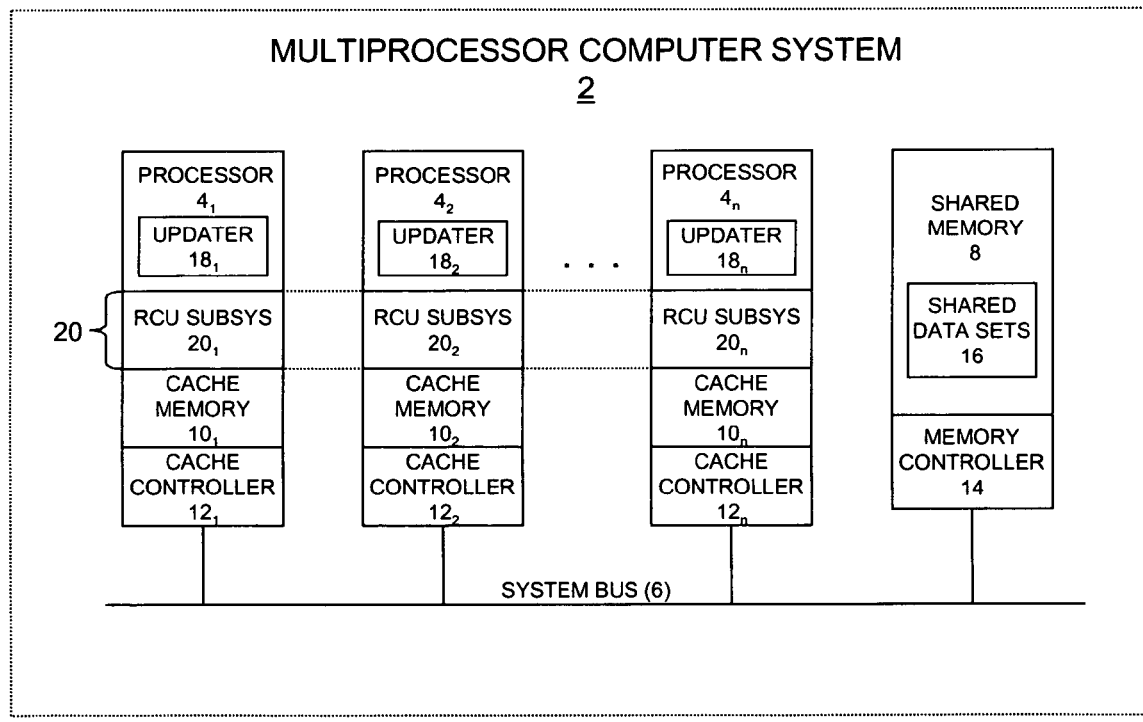
FIG. 4 is a functional block diagram showing a multiprocessor computing system that represents one exemplary environment in which the present invention can be implemented.

Turning now to the figures, wherein like reference numerals represent like elements in all of the several views, FIG. 4 illustrates an exemplary computing environment in which the present invention may be implemented. In particular, a symmetrical multiprocessor (SMP) computing system 2 is shown in which multiple processors $4_1$, $4_2$ ... $4_n$ are connected by way of a common bus 6 to a shared memory 8. Respectively associated with each processor $4_1$, $4_2$ ... $4_n$ is a conventional cache memory $10_1$, $10_2$ ... $10_n$ and a cache controller $12_1$, $12_2$ ... $12_n$. A conventional memory controller 14 is associated with the shared memory 8. The computing system 2 is assumed to be under the management of a single multitasking operating system adapted for use in an SMP environment.

It is further assumed that update operations executed within kernel or user mode processes, threads (or within other execution contexts) will periodically perform updates on shared data sets 16 stored in the shared memory 8. Reference numerals $18_1$, $18_2$ ... $18_n$ illustrate individual data update operations (updaters) that may periodically execute on the several processors $4_1$, $4_2$ ... $4_n$. As described by way of background above, the updates performed by the data updaters $18_1$, $18_2$ ... $18_n$ can include modifying elements of a linked list, inserting new elements into the list, deleting elements from the list, and many other types of operations. To facilitate such updates, the several processors $4_1, 4_2 \ldots 4_n$ are programmed to implement a read-copy update (RCU) subsystem 20, as by periodically executing respective read-copy update instances $20_1, 20_2 \ldots 20_n$ as part of their operating system functions. Although not illustrated in the drawings, the processors $4_1, 4_2 \ldots 4_n$ also periodically execute read operations on the shared data sets 16. Such read operations will typically be performed substantially more often than updates, insofar as this is one of the premises underlying the use of read-copy update.

Figure 5:
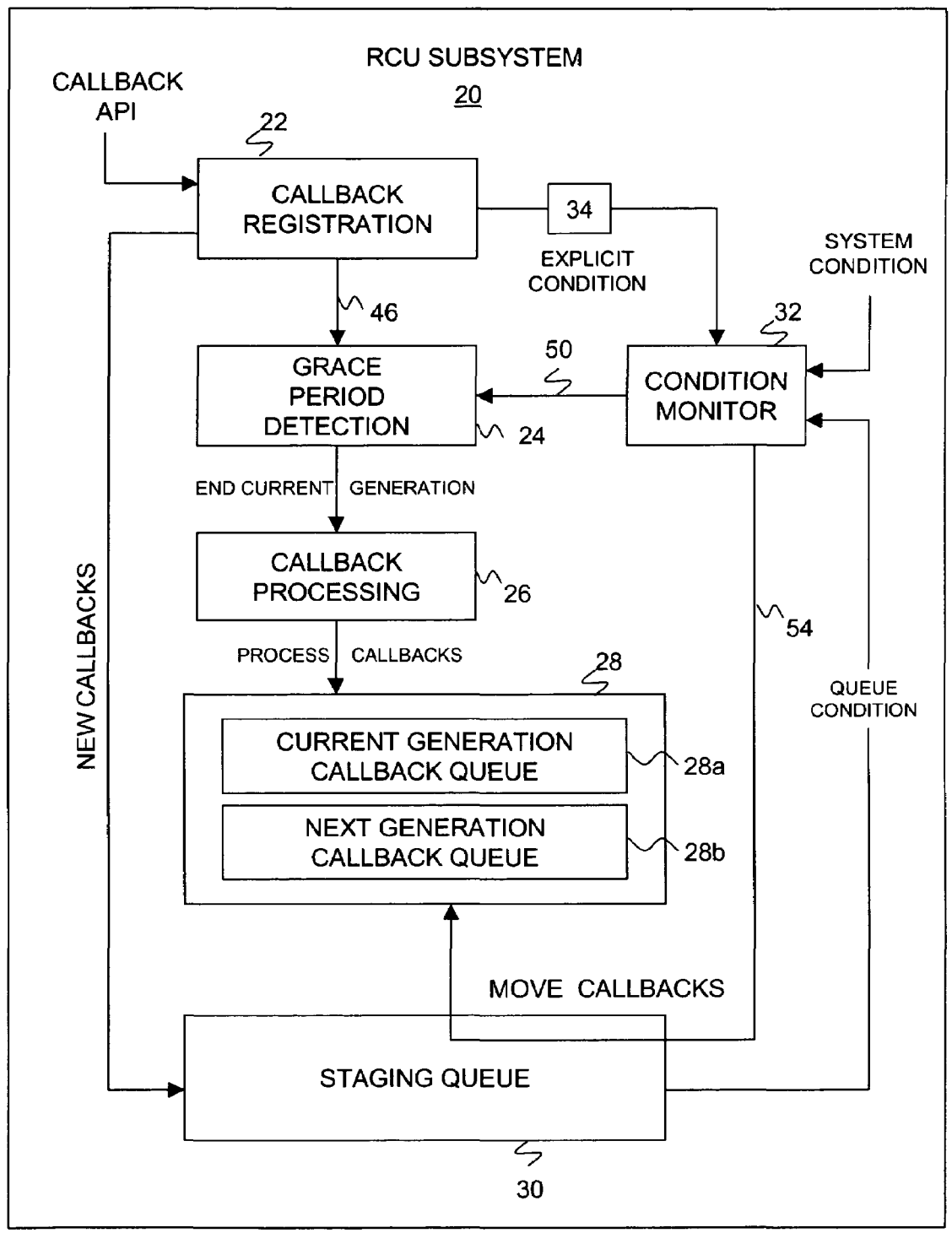
FIG. 5 is a functional block diagram showing a read-copy update subsystem according to a first exemplary embodiment of the present invention.

As shown in FIG. 5, the read-copy update subsystem 20 includes a callback registration component 22 as part of its functionality. The callback registration component 22 serves as an API (Application Program Interface) to the read-copy update subsystem 20 that can be called by the updaters $18_2 \ldots 18_n$ to register requests for deferred (second phase) data element updates following initial (first phase) updates performed by the updaters themselves. As is known in the art, these update requests involve the removal of stale data elements, and will be handled as callbacks within the read-copy update subsystem 20. The read-copy update subsystem 20 additionally includes a grace period detection component 24 and a callback processing component 26, both of which can be implemented according to any of the techniques known to those who are familiar with read-copy update.

The read-copy update subsystem 20 also maintains a set of one or more callback queues 28 that are manipulated by the callback registration component 22 and the callback processing component 26. The callback queue set 28 can be implemented using a shared global array that track callbacks registered by each of the updaters $18_1, 18_2 \ldots 18_n$. Alternatively, each read-copy update subsystem instance $20_1, 20_2 \ldots 20_n$ can maintain an array in a corresponding one of the cache memories $10_1, 10_2 \ldots 10_n$ that defines a per-processor queue set. In either case, a queue in the callback queue set 28 will be appended (or prepended) with new callbacks by the callback registration component 22 as such callbacks are registered. The callback processing component 26 is responsible for executing the callbacks referenced on the callback queue set 28, and for removing the callbacks therefrom as they are processed.

As disclosed in U.S. Pat. No. 5,727,209 (referenced above) the queue set 28 can be implemented using two queues 28a and 28b for managing callbacks. Queue 28a is a current generation queue that specifies callbacks eligible for processing at the end of the current grace period. Queue 28b is a next generation queue for accumulating callbacks that will not become eligible for grace period processing until the end of the next grace period that follows the current grace period. According to conventional callback queuing, new callbacks registered by the callback registration component 22 are accumulated on the next generation queue 28b. The new callbacks cannot be added to the current generation queue 28a because that queue is only for callbacks that have been pending since the beginning of the current grace period. Only those callbacks are eligible to be processed at the end of the current grace period.

The reason why new callbacks are not eligible for processing and cannot be placed on the current generation queue 28a becomes apparent if it is recalled that a grace period represents a time frame in which all processors have passed through at least one quiescent state. If a callback has been pending since the beginning of a grace period, it is guaranteed that no processor will maintain a reference to the data element associated with the callback at the end of the grace period. On the other hand, if a callback was registered after the beginning of the current grace period, there is no guarantee that all processors potentially affected by this callback's update operation will have passed through a quiescent state. Indeed, if a new callback was placed on the current generation queue 28a shortly before the end of the current grace period, there might only be one or two processors that have passed through quiescent states since the callback was registered.

All callbacks accumulated on the next generation queue 28b must wait for the end of the current grace period in order to become eligible for processing. When this occurs, the callback processing component dispatches the callbacks in the current generation queue 28a, assigns all callbacks in the next generation queue 28b to the current generation queue 28a, and waits for the end of the next grace period.

It will be appreciated that the foregoing callback handling technique will assign callbacks from the next generation queue 28b to the current generation queue 28a regardless of the number of accumulated callbacks. This means that grace period detection processing may or may not be amortized over many callbacks. As described by way of background above, inefficiencies will result without some level of amortization. The solution provided by exemplary embodiments of the present invention is to manage callbacks in such a way that grace period detection processing is adequately amortized, while monitoring conditions warranting urgent callback processing so that grace period detection can be promptly initiated when needed.

To that end, the present invention contemplates that callbacks (or any other form of deferred update request) will be buffered in some way until a monitored condition warrants the invocation of grace period detection (followed by callback processing) relative to the buffered callbacks. FIG. 5 shows the use of a callback staging queue 30 to provide the callback buffering function. As in the case of the queue set 28, the staging queue 30 can be implemented globally or replicated on a per-processor basis. Staging queue replication could be alternatively established on a per-process, per-thread, per-task, or other basis in order to avoid "cache thrashing."

A condition monitor 32, which could be implemented as part of the grace period detection component 24, defers callback detection processing and allows callbacks to remain on the staging queue 30 until a condition being monitored by the condition monitor is detected, at which point callback processing relative to the buffered callbacks is deemed to be warranted. There are any number of conditions that could be monitored by the condition monitor 32. Examples include, but are not limited to, one or more of the following:

1) the number of buffered callbacks reaches a threshold number;
2) the buffered callbacks have been buffered for a threshold time period;
3) the buffered callbacks include a callback designated as urgent;
4) a low-memory event has been encountered;
5) a low-memory event has being encountered on a memory type and the callback corresponds to that memory type.

The above exemplary conditions may be grouped into three categories. Conditions (1) and (2) represent queue conditions. Conditions (4) and (5) represent system conditions. Condition (3) represents an explicit condition. FIG. 5 shows that the condition monitor 32 monitors each condition category. System conditions can be monitored using conventional information maintained by an operating system kernel, such as the amount of available system memory. Queue conditions can be monitored by examining the staging queue 30, and making determinations about the number of callbacks, the pendency time of the oldest callback, etc.

Explicit conditions, such a whether a callback is urgent, can be monitored by examining the staging queue 30 or by receiving an explicit indication from the callback registration component 22. In the first case, a callback urgency indicator could be stored with a callback's entry in the staging queue 32. Each callback would thus include the callback function and arguments specified by an updater $18_1, 18_2 \ldots 18_n$ (as is conventional), and would additionally include an urgency indicator flag. In the second case, the callback registration component 22 could alert the condition monitor 32 of the urgent callback by way of a suitable message passing scheme. For example, as shown in FIG. 5, the callback registration component 22 could set an urgency indicator 34 that is tested by the condition monitor 32. The urgency indicator 34 can be a per-processor variable or a global variable. The advantage of indicating urgency globally is that all callbacks on all processors could be advanced. The advantage of indicating urgency on a per-processor basis is that cache locality is preserved.

The urgent nature of a callback can be indicated when the callback is registered. This can be done in several ways, including modifying the API provided by the callback registration component 22 to allow an updater $18_1, 18_2 \ldots 18_n$ to pass a parameter that indicates a need for urgent grace-period detection. The conventional "call_rcu( )" API function used in many read-copy update implementations could be so modified. Alternatively, a separate API function, which is similar to "call_rcu( )" but could instead be designated "call_rcu_now( )," may be used.

When the condition monitor 32 detects one of the conditions being monitored, it moves buffered callbacks from the staging queue 30 into the next generation callback queue 28b. If there are no pending callbacks in the current generation callback queue 28a (which will normally be the case), the buffered callbacks will be eligible for grace period detection. They will be moved by the callback processing component 26 from the next generation callback queue 28b to the current generation callback queue 28a. Grace period detection processing will then commence. In an alternative implementation, the condition monitor 34 could move the buffered callbacks directly from the staging queue 32 to the current generation call back queue 28a, provided the latter is empty.

Figure 6:
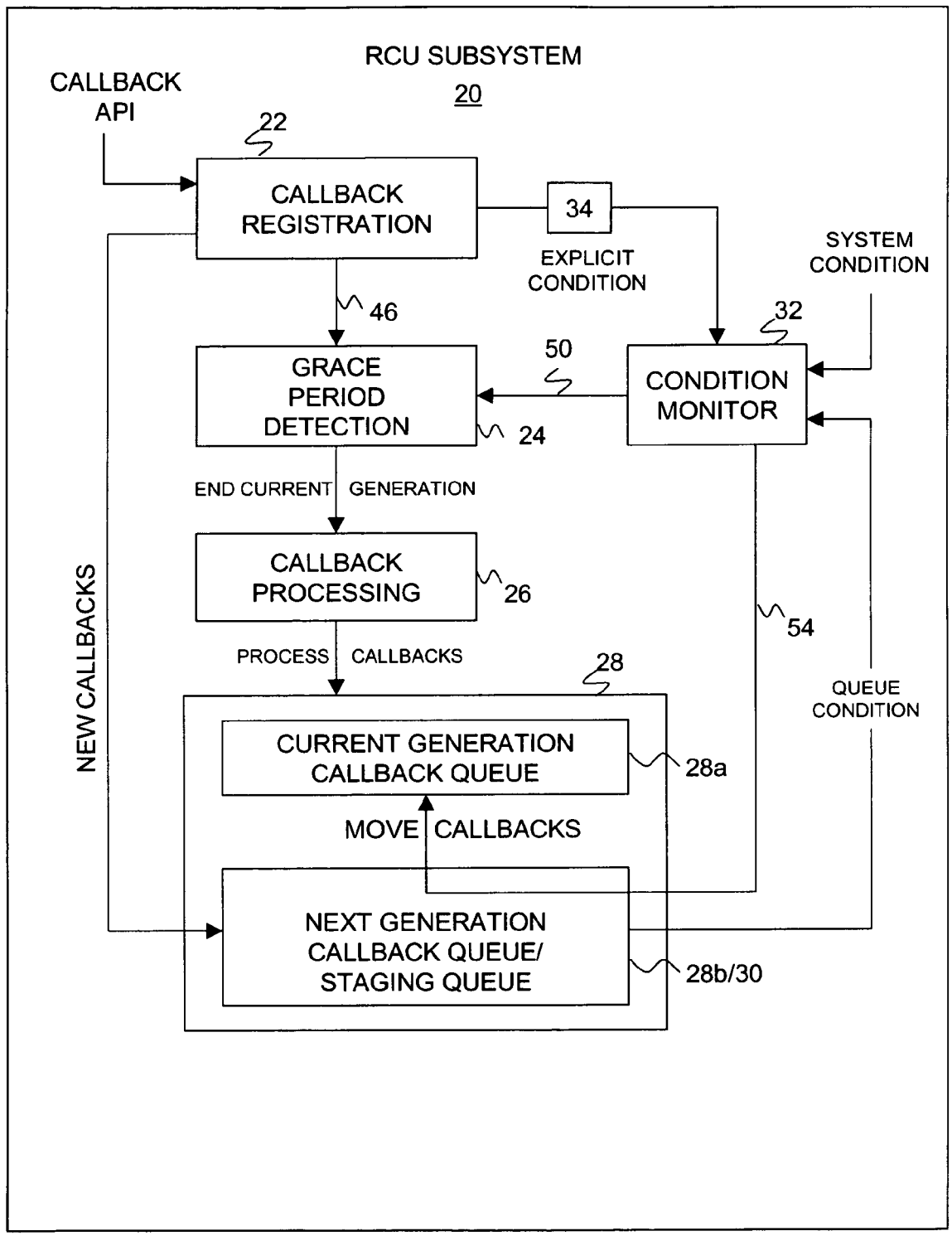
FIG. 6 is a functional block diagram showing a read-copy update subsystem according to a second exemplary embodiment of the present invention.

In order to prevent the next generation callback queue 28b from being rendered obsolete by the staging queue 30, efficient implementations of the present invention might utilize the next generation callback queue 28b as the staging queue 30. Such an embodiment is shown in FIG. 6. In this embodiment, instead of moving callbacks from the next generation queue 28b to the current generation callback 28a whenever the latter is empty, the callbacks would only be moved as directed by the condition monitor 32.

Regardless of how the staging queue 30 is implemented, it will be appreciated that all callbacks being buffered thereon may initially be ineligible for grace period detection due to a current generation of callbacks being processed. However, once the current callback generation is dispatched, all buffered callbacks will become eligible for grace period detection processing. Notwithstanding such eligibility, grace period detection will not be performed relative to the buffered callbacks until the occurrence of one of the conditions being monitored by the condition monitor 32. Only when such condition warrants grace period detection will such processing be permitted. In most cases, the condition that warrants grace period detection processing will arise from the staging queue 30 reaching a threshold number of callbacks or holding at least one callback for a threshold time period. These thresholds can be established according to design preferences. In the comparatively rare case where a low memory situation arises, or where a callback is marked urgent, grace period detection can be promptly initiated so as to address the urgent condition. In this way, grace period detection overhead can be amortized over plural update requests while being sensitive to conditions warranting prompt grace period detection.

Figure 7:
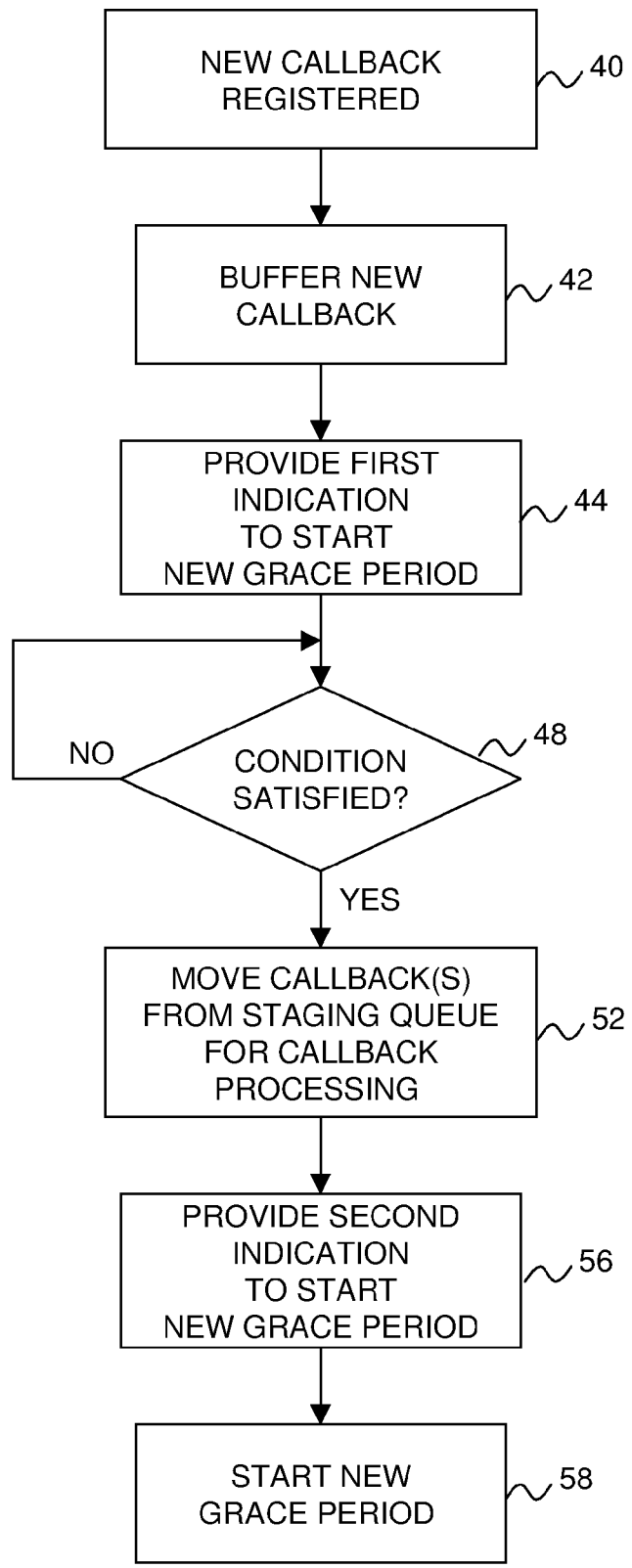
FIG. 7 is a flow diagram showing exemplary processing logic that may be implemented in accordance with the present invention.

FIG. 7 provides an overview of the processing that may be performed by the RCU subsystem 20 in accordance with the present invention. In step 40, a new callback is registered at the callback registration component 22 by an updater $18_1$, $18_2 \ldots 18_n$. In step 42, the callback registration component 22 buffers the new callback onto the staging queue 30. Then in step 44, according to conventional callback-based read-copy update processing, the callback registration component 22 sets an indicator 46 (see FIG. 5 or 6) that indicates to the grace period detection component 24 that detection of a new grace period is being requested. In a conventional callback-based read-copy update system, the indicator 46 would authorize the grace period detection component 24 to commence detection of a new grace period as soon as any current grace period ends. However, in accordance with the present invention, the grace period detection component 26 is programmed to wait in step 48 for a further indication 50 (see FIG. 5 or 6) from the condition monitor 32 before commencing detection of the new grace period. When the condition monitor 32 detects a monitored condition in step 48, it manipulates the staging queue 30 in step 52 (as shown by the arrow 54 in FIG. 5 or 6) by moving all buffered callbacks to an appropriate queue in the queue set 28. The condition monitor 32 then provides the indication 50 to the grace period detection component 26. in step 56 of FIG. 7. response to receiving the indication 50, the grace period detection component 26 becomes authorized in step 58 to commence detection of a new grace period on behalf of the previously buffered callbacks. This will occur as soon as the current grace period ends, or immediately if there is no current grace period is being tracked. As is conventional, the callback processing component 26 is thereafter notified when the new grace period ends, at which point the previously buffered callbacks can be processed.

Figure 8:
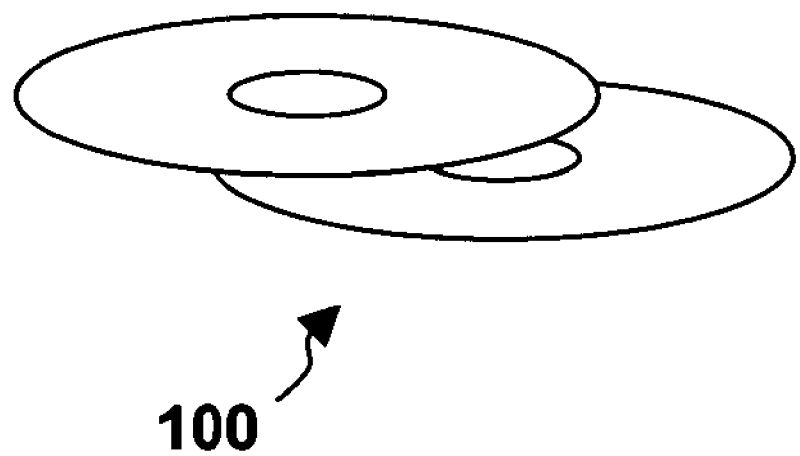
FIG. 8 is a diagrammatic illustration of storage media that can be used to store a computer program product for implementing read-copy update grace period detection functions in accordance with the invention.

Accordingly, a technique for managing callback requests while minimizing period detection overhead has been disclosed. It will be appreciated that the foregoing concepts may be variously embodied in any of a data processing system, a machine implemented method, and a computer program product in which programming means are recorded on one or more data storage media for use in controlling a data processing system to perform the required functions. Exemplary data storage media for storing such programming means are shown by reference numeral 100 in FIG. 8. The media 100 are shown as being portable optical storage disks of the type that are conventionally used for commercial software sales. Such media can store the programming means of the invention either alone or in conjunction with an operating system or other software product that incorporates read-copy update functionality. The programming means could also be stored on portable magnetic media (such as floppy disks, flash memory sticks, etc.) or on magnetic media combined with drive systems (e.g. disk drives) incorporated in computer platforms.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for managing requests for deferred updates to shared data elements while minimizing grace period detection overhead associated with determining whether pre-existing references to the data elements have been removed, comprising:
   buffering plural update requests that are eligible for grace period detection without performing grace period detection processing that determines whether a grace period has elapsed to signify it is safe to process said update requests;
   monitoring a set of conditions that are indicative of whether said grace period detection processing should be commenced, said conditions comprising buffer queue conditions, system conditions and explicit conditions, including:
   (1) said buffered update requests reaching a threshold number, (2) said buffered update requests being buffered for a threshold time period, (3) said buffered update requests including an update request designated as urgent, (4) a low-memory event being encountered, and (5) a low-memory event being encountered on a memory type and said buffered update requests including an update request corresponding to said memory type;
   determining whether any of said conditions warrants commencement of said grace period detection processing; and
   if warranted by one of said conditions, performing said grace period detection processing relative to said update requests.

2. The method of claim 1 wherein said one of said conditions is identified by an explicit indicator associated with one of said update requests.

3. The method of claim 2 wherein said explicit indicator is passed as parameter when a function associated with said update request is invoked.

4. The method of claim 2 wherein said explicit indicator is generated by said update request being invoked using a pre-designated update request function.

5. The method of claim 1 wherein said buffered update requests are buffered on a queue.

6. The method of claim 1 wherein said method is implemented in conjunction with a read-copy update subsystem and said buffered update requests are buffered on a staging queue that is separate from a current generation or next generation update request queue of said read-copy update subsystem.

7. The method of claim 6 wherein said buffered update requests are moved from said staging queue into one of said current generation or next generation update request queues of said read-copy update subsystem upon the occurrence of said condition warranting grace period detection processing.

8. The method of claim 1 wherein said method is implemented in conjunction with a read-copy update subsystem that includes one or more queues of update requests, and wherein said buffered update requests are buffered on one of said queues.

9. The method of claim 1 wherein said method is implemented in conjunction with a read-copy update subsystem that includes a first queue of update requests awaiting expiration of a grace period and a second queue of update requests awaiting processing of said update requests in said first queue, and wherein said buffered update requests are buffered on said second queue.

10. A method for managing callbacks processed by a read-copy update subsystem while minimizing grace period detection overhead, comprising:
    buffering plural callbacks that are eligible for grace period detection without performing grace period detection processing that determines whether a grace period has elapsed to signify it is safe to process said callbacks;
    monitoring a set of conditions that are indicative of whether said grace period detection processing should be commenced, said conditions comprising buffer queue conditions, system conditions and explicit conditions, including:
    (1) said buffered callbacks reaching a threshold number, (2) said buffered callbacks being buffered for a threshold time period, (3) said buffered callbacks including a callback designated as urgent, (4) a low-memory event being encountered, and (5) a low-memory event being encountered on a memory type and said buffered callbacks including a callback corresponding to said memory type;
    determining whether any of said conditions warrants commencement of grace period detection processing; and
    if warranted by one of said conditions, performing said grace period detection processing relative to said callbacks;
    whereby grace period detection overhead can be amortized over plural callbacks while being sensitive to conditions warranting prompt grace period detection.

11. A method for managing requests for deferred updates to shared data elements while minimizing grace period detection overhead associated with determining whether pre-existing references to the data elements have been removed, comprising:
    establishing a buffer to hold plural update requests that are eligible for grace period detection without performing grace period detection processing that determines whether a grace period has elapsed to signify it is safe to process said update requests;
    monitoring a set of conditions that are indicative of whether said grace period detection processing should be commenced, said conditions comprising buffer queue conditions, system conditions and explicit conditions, including:
    (1) said update requests reaching a threshold number, (2) said update requests being buffered for a threshold time period, (3) said update requests including an update request designated as urgent, (4) a low-memory event being encountered, and (5) a low-memory event being encountered on a memory type and said update requests including an update request corresponding to said memory type;
    establishing an indicator for indicating the existence of any of said conditions warranting commencement of said grace period detection processing; and
    establishing an activator responsive to said indicator indicating said condition and adapted to activate grace period detection relative to said update requests;
    whereby grace period detection overhead can be amortized over plural update requests while being sensitive to conditions warranting prompt grace period detection.

* * * * *